May 8, 1945.  L. L. IRVIN  2,375,655
AVIATOR'S EMERGENCY EQUIPMENT
Filed Oct. 29, 1942   3 Sheets-Sheet 1
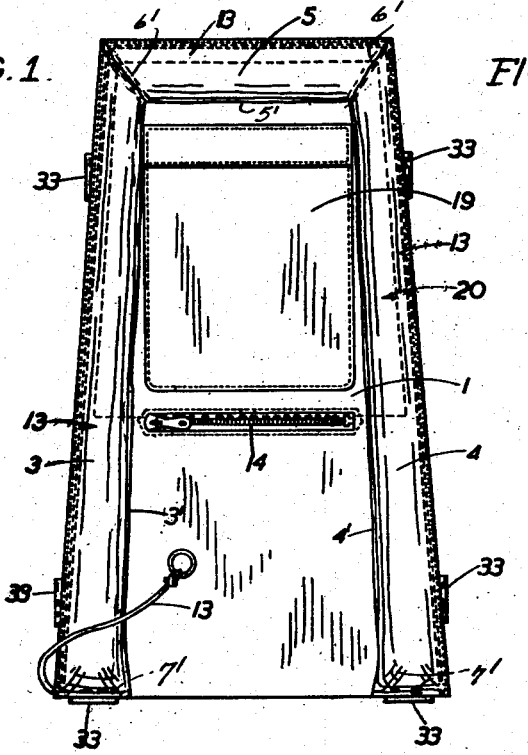
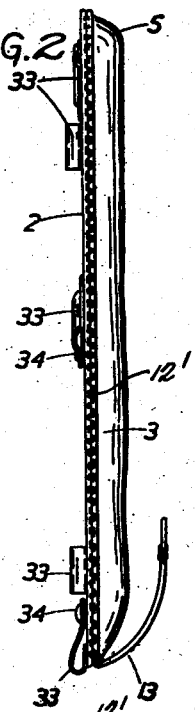
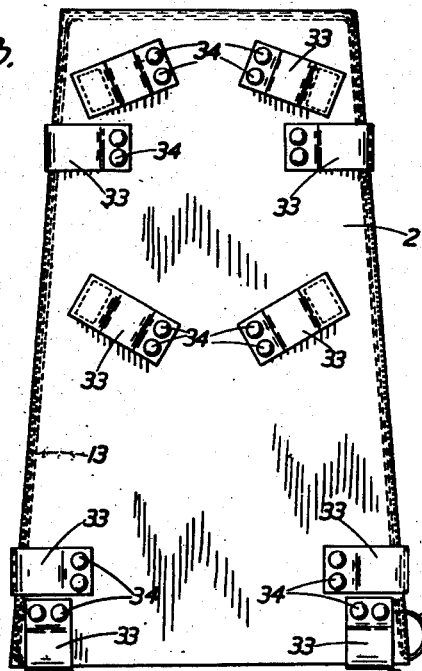
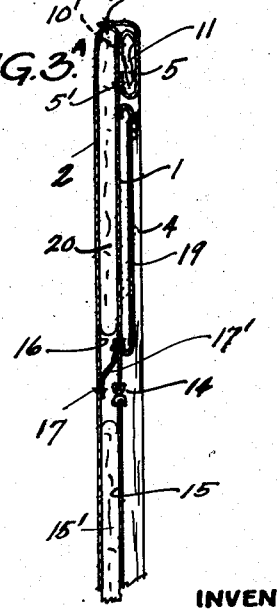
INVENTOR
Leslie L. Irvin.
BY Lancaster, Allwine and Rommel
ATTORNEYS May 8, 1945.  L. L. IRVIN  2,375,655
AVIATOR'S EMERGENCY EQUIPMENT
Filed Oct. 29, 1942  3 Sheets-Sheet 2
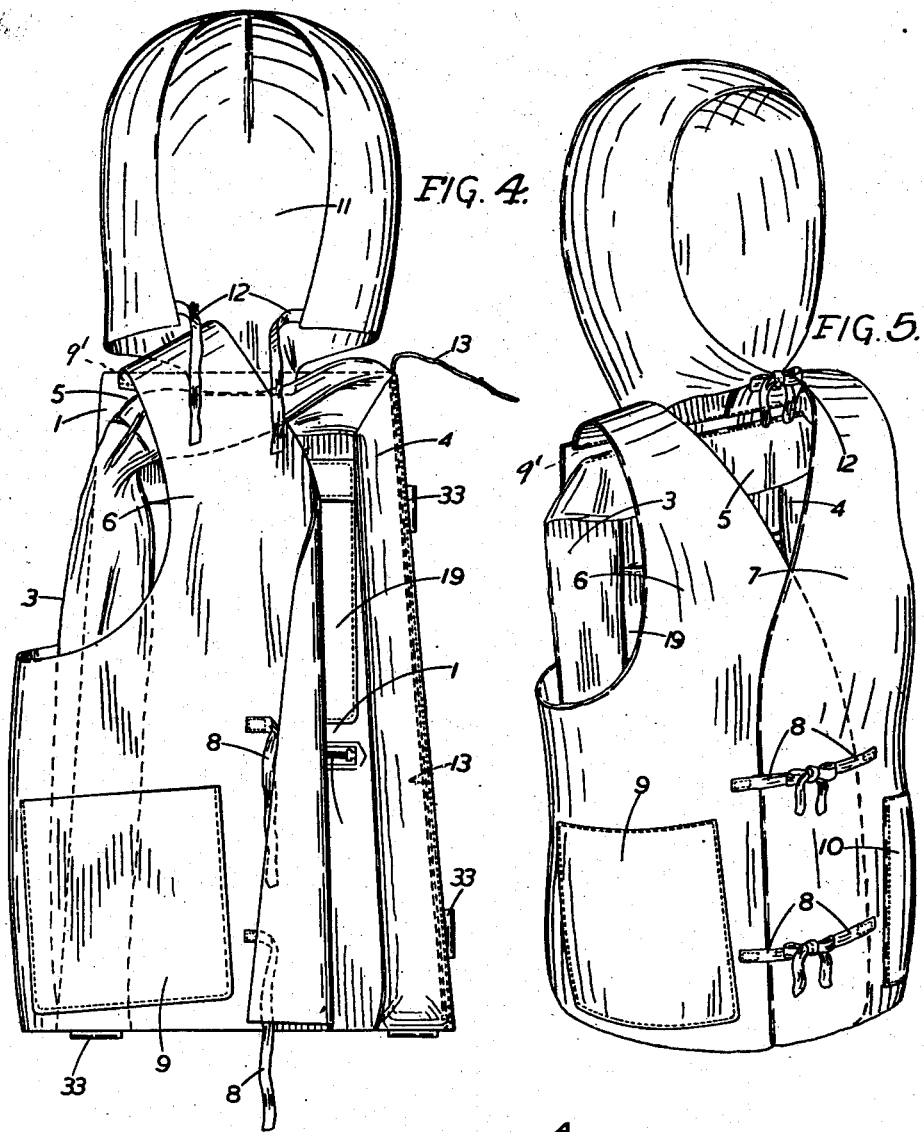
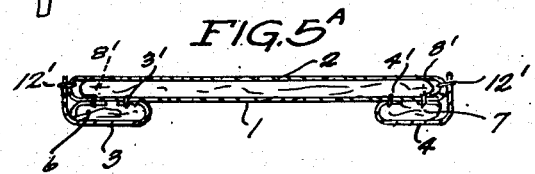
INVENTOR
Leslie L. Irvin.

May 8, 1945. L. L. IRVIN 2,375,655
AVIATOR'S EMERGENCY EQUIPMENT
Filed Oct. 29, 1942 3 Sheets-Sheet 3

INVENTOR
Leslie L. Irvin.
BY Lancaster, Allwine and Rommel
ATTORNEYS

Patented May 8, 1945

2,375,655

UNITED STATES PATENT OFFICE 2,375,655

AVIATOR'S EMERGENCY EQUIPMENT

Leslie L. Irvin, Letchworth, England, assignor to Irving Air Chute Company, Inc., Buffalo, N. Y., a corporation Application October 29, 1942, Serial No. 463,821
In Great Britain November 7, 1941

6 Claims. (Cl. 224—5)

This invention relates to improvements in parachute equipment.

The primary object of this invention is the provision of emergency equipment for aviators such as would likely be necessary in the event of a forced landing in the desert, in swamp land or other areas where local assistance may not be quickly available.

A further object of this invention is the provision of the emergency equipment above mentioned which can be embodied in a compact, simple and efficient manner with conventional parachute equipment, so that overall weight and bulk will not be appreciably increased.

A further object of this invention is the provision of emergency equipment of a nature to be hereinafter described which can be compactly and efficiently associated with the back pad of a conventional parachute harness.

A further object of this invention is the provision of means which can be associated with the back pad of a conventional parachute harness to provide an emergency garment resembling a waistcoat which normally is folded compactly within the confines of the pad, but which may be released should the occasion require.

A further object of this invention is the provision of a back pad which may have associated therewith a hood or head covering which may be normally compactly confined within the pad, but which may be quickly released should the occasion require.

A further object of this invention is the provision of means which may be associated with the back pad of a conventional parachute harness for efficiently housing a haversack, satchel, or the like for the housing of such articles as food rations in tablet form, water-purifying tablets, medicinal or first aid supplies, matches, compasses, knife, map, water container, ground strip, mosquito net, and signalling means, such as for instance, a flag, mirror or torch.

A further object of this invention is the provision of a pad which may compactly associate therewith a flexible water container.

Other objects and advantages of this invention will be apparent during the course of the following detailed description.

In the accompanying drawings, forming a part of this specification, and wherein similar reference characters designate corresponding parts thruout the several views, Figure 1 is a front elevation of the improved back pad in normal condition.

Figure 2 is a side elevation of the pad shown in Figure 1.

Figure 3 is a rear view of the back pad in normal position showing the straps for harness attachment.

Figure 3ª is a vertical cross sectional view taken thru the upper portion of the pad along the medial line of the pad, and showing structural details thereof.

Figure 4 is a front elevation of the pad with the right side of the pad opened and disclosing the right side of the waistcoat in extended position, and showing the hood also in extended position.

Figure 5 is a perspective view showing the side and top portions of the pad opened and with the waistcoat and hood in extended position.

Figure 5ª is a transverse cross sectional view taken thru the back pad in a normal folded condition.

Figure 6:
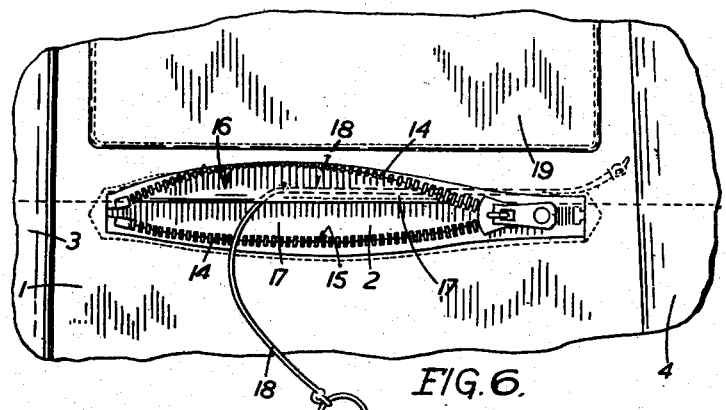

Figure 6 is an enlarged fragmentary front elevation of the back pad showing a pocket arrangement therefor.

Figures 7, 8:
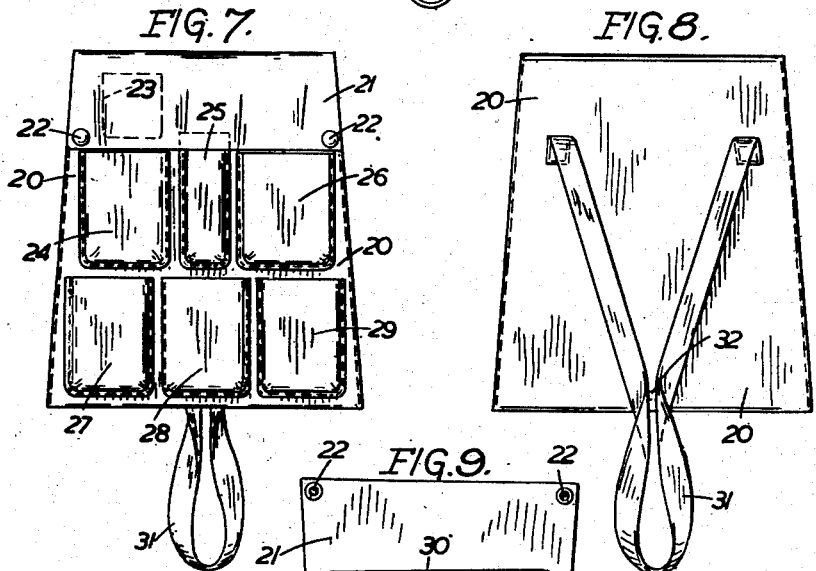

Figure 7 is a front elevation of the satchel incorporated in the back pad.

Figure 8 is a rear view of the satchel.

Figure 9:
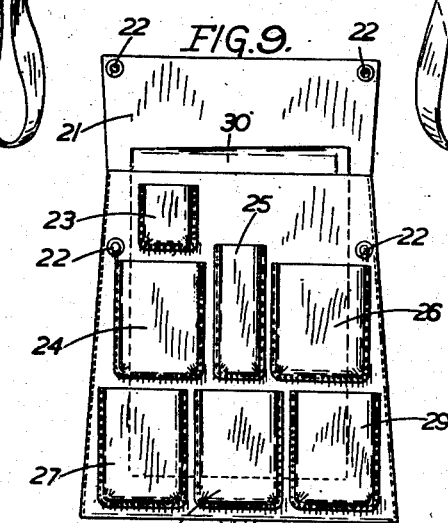

Figure 9 is a front view of the satchel showing the pocket arrangement for emergency supplies, etc.

In the drawings, wherein for the purpose of illustration is shown only a preferred embodiment of the invention, the numerals 1 and 2 indicate front and rear walls forming the body of the back pad. They may be of canvas or other suitable material and may receive therebetween padding (not shown) if desired. Strips 3 and 4 of canvas or other suitable material are stitched along lines 3' and 4' spaced inwardly from the edges of the pad by say about two inches, and a strip 5 is similarly stitched along the line 5' across the top of the pad. The adjacent edges of said strips 3, 4 and 5 are stitched together at 6' and the bottom edges of the side strips 3 and 4 are stitched to the pad at 7'.

Side extensions 6 and 7 of canvas or other suitable material are stitched to the front face of the back pad along lines intermediate the inner edges of the side strips 3 and 4 and the side edges of the pad, at 8'. These side extensions are in the form of the sides of a waistcoat-like garment as can be seen in Figures 4 and 5 of the drawings, the tops of the shoulder portions being stitched to the back pad as shown in Figures 4 and 5, at 9', so that in conjunction with said pad they form arm holes for a wearer.

The side extensions 6 and 7 are provided with tapes 8 or other suitable means for enabling them to be secured together in front of a wearer and they may include any desired pockets, such as those designated 9 and 10.

An upper extension 11 of canvas or other suitable material constituting a hood or like head covering is stitched to the top of the pad along a line intermediate the inner edge of the above-mentioned top strip 5 and the top edge of the back pad at 10'. This hood is provided, if desired, with a draw-tape 12 or the like for tying around the neck.

When the aforesaid top extension 11 and the side extensions 6 and 7 are not in use they are rolled and located in the pockets formed between the back pad proper and the aforesaid top strip 5 and side strips 3 and 4 respectively, and the outer edges of said strips 3, 4 and 5 are then secured to the pad by rows of stitches 12'. A string or cord 13 is threaded through such stitches in such a way that by pulling said string or cord the stitches may be broken around the three sides of the pad, thus quickly freeing the aforesaid hood and side portions. A conventional slide or Talon fastener may be used instead.

An opening giving access to the space between the inner and outer parts 1 and 2 of the back pad extends across the inner face thereof preferably a little below the center line of the pad. This opening may be releasably closed by a sliding clasp fastener 14, and when opened it gives access to a pocket 15 formed in the lower part of the pad. This pocket is intended to receive a flexible water container 15'.

A further pocket designated 16 in Figure 6 is formed above the aforesaid opening extending across the inside of the back pad, but this pocket is normally maintained in a closed condition by means of a row of break threads, there being for instance a strip of canvas 17' permanently stitched across the inside of the inner face of the back pad and stitched to the inside of the rear face of the pad by break threads designated 17 in Figure 6. A string, cord or the like 18 is passed through said break threads so that the threads can be rapidly broken merely by pulling said string or cord. In Figure 6 the fastener 14 is shown fully opened and the cord 18 is shown in an intermediate condition in which the entrance to the pocket 16 is partially opened.

A sheet 19 of canvas or other suitable material is stitched along its side and bottom edges to the inner face 1 of the pad in a position above the above-mentioned opening extending thereacross. This sheet thus forms another pocket and the entrance to this pocket may be entirely free or be provided with any suitable fastening capable of being easily released or secured.

The pocket formed by the panel 19 is adapted to receive documents appropriate to any particular flight such, for instance, as a map and landing instructions, and it is for that reason that the pocket is readily accessible. The pocket 15, i. e. the one which is opened by the above-mentioned sliding clasp fastener 14 is adapted to receive a flexible water bottle 15' and as it is necessary for such bottle to be replenished with fresh water the pocket is adapted for being easily opened and closed.

The pocket 16 to which access is had upwardly through the opening extending across the inner face of back pad is, however, adapted to receive articles which do not require renewal at short intervals but can, for instance, be assembled by the manuafcturer of the back pad. The entrance to such pocket is therefore controlled by the aforesaid row of break threads 17 and the end of the controlling string, cord or the like 18 may pass through the opening controlled by the sliding clasp fastener 14. A user of the equipment can therefore ascertain merely by checking that the cord 18 has not been operated that the desired emergency equipment is present.

The aforesaid emergency equipment is not located loosely in the above described pocket 16 in the example now being described but is located in a satchel 20 adapted to be inserted in such pocket. This satchel is shown in detail in Figures 7 to 9 and is in the form of a flat rectangular bag and is provided with a flap 21 closing the entrance to the interior thereof, such flap being, for instance, releasably secured in a closed condition by means of snap fastener 22 or other suitable fasteners. The various articles to be carried by this satchel may become undesirably packed together if merely inserted in the main container of such satchel and I accordingly provide a number of subsidiary pockets on the face of the satchel each of which may be adapted for receiving one particular article. The entrances to these subsidiary pockets need not necessarily be provided with any securing means, as in general it is desirable for the various articles contained therein to be transferred to the main container when the emergency equipment is in use.

The number, size and arrangement of the aforesaid subsidiary pockets may, of course, vary to suit the articles to be accommodated but there may, for instance, be seven pockets designated 23, 24, 25, 26, 27, 28 and 29 in Figures 7 and 9 and these may be adapted to receive a knife, compass, mirror, matches, water-purifying tablets and packages containing food or medicine in tablet form.

It may also be desirable for the emergency equipment to include a ground strip, signalling flag, mosquito net or the like and any such articles of a sheet-like nature are preferably folded and inserted in the main pocket of the satchel thus serving as padding which can be located between the inner face of the back pad and any hard articles contained in such satchel. By way of illustration a folded sheet 30 is shown protruding from the main pocket of the satchel in Figure 9.

The aforesaid satchel is preferably provided with means for facilitating its being carried. Thus, for instance, a tape 31 constituting an arm or shoulder sling may be stitched to the back of such satchel, and in order to avoid any entanglement during insertion or removal of the satchel in the pocket 16 of the back pad, said tape 31 may be temporarily secured to the satchel for instance by break threads designated 32 in Figure 8.

In the event of an aviator making a forced descent with the above described equipment, he can discard the parachute harness but retain the back pad and he can then pull the cord 13 controlling the break threads securing the side and top flaps 3, 4 and 5 so opening the side and top extensions 6, 7 and 11 and he can then put on the waistcoat-like and hooded garment with the emergency equipment incorporated therein. If the parachutist does not require any additional garment he can open up the pockets in the back pad, withdraw the above described satchel 20 and insert all of the emergency equipment in the main pocket of such satchel.

The back pad can then be discarded and the parachutist need only take the satchel which can be slung over his shoulder.

The above described back pad may be provided with any suitable means for enabling it to be attached to a parachute harness. Thus, for instance, short straps 33 each having one end releasably secured, for instance, by means of press stud fasteners 34, may be fitted to the back of the pad and be adapted to be passed over the back and/or seat straps of the harness.

It is within the contemplation of this invention to assemble one or all of the features of this invention in a seat pad rather than a back pad.

Whilst I have hereinbefore described one specific example of a back pad according to the present invention, I wish it to be understood that there may be various modifications without departing from the spirit of the invention or scope of the claims. Thus, for instance, the back pad may be such that it can be converted into a waistcoat-like garment with or without a hood and without provision for storing articles, supplies or the like, or such pad may include the latter feature only without any provision for conversion of said pad into the form of garment.

I claim:

1. A back pad for aviators comprising a flexible body portion, side waistcoat portions connected to the body portion along the sides thereof, flexible coverings for releasably housing said side waistcoat portions in collapsed position upon said body, and releasable fastener means for quick release of said coverings.

2. A back pad for aviators comprising a flexible body portion, side waistcoat portions connected to the body portion along the sides thereof, flexible coverings for releasably housing said side waistcoat portions in collapsed position upon said body, and releasable fastener means for quick release of said coverings comprising stitching holding said coverings upon said body and a break stitch member for ripping said stitches apart.

3. In emergency equipment for aviators the combination of a flexible parachute harness pad, means on the back surface of the pad for attaching a conventional parachute harness thereto so that the pad lies between the harness and the body of the wearer, garment means carried by the pad, means normally maintaining said garment means in pack folded relation directly upon the pad during normal use of the pad, and means to release said garment means under emergency conditions into extensible relation for use as a garment by the wearer.

4. In a parachute harness back pad the combination of a flexible body portion of a size to substantially cover the back of a wearer's body, means on the surface of the body portion opposite that surface facing the back of the wearer for releasably attaching a parachute harness thereto, and pocket means on the surface of the body portion normally facing the back of the wearer for releasably carrying emergency equipment.

5. A parachute harness back pad comprising a flexible body, means for attaching a parachute harness thereto so that the pad lies between the harness and wearer's body, means on the side of the pad facing the back of the wearer and formed as a part of said parachute harness pad for receiving coat portions, and means for converting said back pad into a coat to be worn by an aviator under emergency conditions.

6. A parachute harness back pad comprising a flexible body, means for attaching a parachute harness thereto so that the pad lies between the harness and wearer's body, means on the side of the pad facing the back of the wearer and formed as a part of said parachute harness pad for receiving coat portions, means for converting said back pad into a coat to be worn by an aviator under emergency conditions, and a head covering hood collapsibly associated with said back pad.

LESLIE L. IRVIN.